United States Patent [19]

Hollinger, Jr.

[11] Patent Number: 4,489,120
[45] Date of Patent: Dec. 18, 1984

[54] ARCHIVAL CONTAINER CONSTRUCTION MATERIAL

[76] Inventor: William K. Hollinger, Jr., 7015 Duncraig Ct., McLean, Va. 22101

[21] Appl. No.: 522,795

[22] Filed: Aug. 12, 1983

[51] Int. Cl.³ .................. B32B 3/28; B32B 29/00
[52] U.S. Cl. .................. 428/182; 428/218; 428/481; 428/534
[58] Field of Search .............. 428/182, 184, 186, 218, 428/532, 534, 535, 481; 162/91, 124, 125, 132, 158; 229/6 R

[56] References Cited

U.S. PATENT DOCUMENTS 2,985,553  5/1961  Anderson ..................... 428/186
3,671,310  6/1972  Brown et al. ................. 428/535
4,207,366  6/1980  Tyler ........................ 428/73
4,263,094  4/1981  Login et al. ................. 428/534

Primary Examiner—Paul J. Thibodeau
Attorney, Agent, or Firm—Murray, Whisenhunt and Ferguson

[57] ABSTRACT

Archival container construction materials including paper, paperboard (both solid fiber board and corrugated board) and, optionally, water-impermeable plastic, in both single- and multi-layer arrangement are disclosed. The container material provides an inner layer consisting of non-buffered, substantially pure alpha-cellulose and an alkaline size. Outer layers of the container material comprise alpha-cellulose, an alkaline buffer and an alkaline size. Optionally, the inner liner and the outer layer(s) are separated by a water-impermeable plastic layer, e.g., polyester film.

15 Claims, 9 Drawing Figures

ARCHIVAL CONTAINER CONSTRUCTION MATERIAL

BACKGROUND OF THE INVENTION

Many attempts have been made to protect container contents from the deleterious effects of both outside elements and from residual chemicals within the container material itself.

Schoettle, U.S. Pat. No. 1,773,064, discloses a cardboard container wherein the inner layer of cardboard is coated with an acid in order to protect the contents of the container from alkaline fumes emitted from the adhesive used in container construction and/or sealing.

Palmer et al, U.S. Pat. No. 1,564,707 and Flynn, U.S. Pat. No. 2,144,453, both relate to packages specifically designed for photographic film. In the former, the wrapping comprising the container is substantially free from sulphur, ammonia, and turpentine. In the latter, there is a black, opaque outer layer and an inner layer which is described only as "inert towards light-sensitive, photographic emulsions". There is no indication as to precisely what materials are used.

Hutter, U.S. Pat. No. 2,534,201 discloses a container having metal corrosion inhibiting characteristics. This is achieved through the use of an inner layer comprised of both an organic amide and an inorganic metal nitrate.

Fox et al, U.S. Pat. No. 2,555,031, discloses a container for storing phosphatic fertilizers for extended periods by coating the inner layer of the container with a lime material.

In the area of archival preservation, i.e. the preservation of papers, photographs, textiles and artifacts of historic, aesthetic or sentimental significance, containers have been historically fabricated from papers developed for the long term preservation of paper documents. However, such containers can have a detrimental effect on their contents. It has been discovered that some archival papers, used to fabricate negative envelopes for the preservation of photographic materials, fail to pass basic silver tarnishing tests (e.g., Collings/Young silver tarnish test). Moreover, some artifacts such as certain textiles and photographic materials require archival containers with conflicting specifications. For example, all generally accepted archival containers available today contain alkaline buffers (almost always $CaCO_3$) to ward off the effects of atmospheric pollutants and acids or impurities which may migrate from adjacent materials. However, certain textiles such as wool and silk can be harmed by the buffers. Photographic gelatin is stabilized in an acid state and, therefore, it may also be damaged by exposure to alkaline buffers.

The present invention overcomes these disadvantages of the prior archival containers by providing materials for the construction of archival containers so as to achieve maximum permanence without subjecting the stored artifacts to the possibility of any deleterious effects from the buffers found in normal archival boxboard.

DETAILED DESCRIPTION OF THE PREFERRED EMBODIMENTS

Cellulose is the preponderant and essential constituent of all vegetable tissues and fibers, including especially cotton and wood. It can be considered to be a very stable polymer of glucose, in which each glucose unit of the chain has three —OH groups. Three forms of cellulose exist:

alpha-cellulose—the fraction that can be filtered out of a mixture consisting of the fibrous material and sodium hydroxide solution (7.3%) of maximum dissolving power, after the fibers have been previously swelled with sodium hydroxide solution (17.5%);

beta-cellulose—the fraction that precipitates at room temperature (15°–35° C.) after the filtrate has been acidified; and gamma-cellulose—the fraction that remains in solution after removing beta-cellulose (ASTM definition, for alpha-, beta- and gamma-cellulose; ASTM D-588-42).

The present invention utilizes alpha-cellulose.

Figure 1:
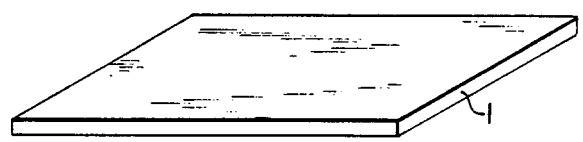
FIG. 1 is a perspective view of a paper sheet according to the present invention.

FIG. 1 illustrates a sheet of paper 1 consisting of non-buffered, substantially pure alpha-cellulose and an alkaline size. By substantially pure is meant an alpha-cellulose free of lignin, groundwood, particles of metals, waxes, and plasticizers, coloring agents, oxidizing chemicals, additives and potentially harmful non-cellulose products. Moreover, the sulfur content of the paper is desirably less than 0.0008% by weight reducible sulfur (ASTM D 984-74 or TAPPI T-406, SU72). An alkaline size is included in the paper to increase its stiffness, strength, smoothness and/or weight. Suitable alkaline sizes include Aquapel (an alkylaketene dimer—Hercules, Inc.). Preferably, the size is incorporated in an amount of at least about 1% by weight, higher amounts of size being retained only with difficulty. By the use of substantially pure alpha-cellulose and an alkaline size to form this paper, a paper particularly suitable for the archival storage of silver image photographic artifacts is achieved. Moreover, the paper has a pH in the natural range for cellulose (near neutral (6.8–7.3)) and is non-tarnishing as per accelerated tarnishing tests ASTM D 2043-69 and TAPPI T-444, T-564. The paper also passes the silver tarnish test developed by T. J. Collings and F. J. Young (London, England). The surface of the paper is smooth and free from knots, shives and abrasive particles.

Figure 2:
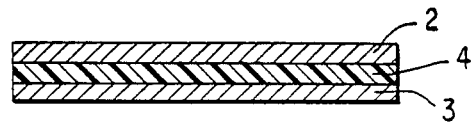
FIG. 2 is a sectional view of an alkaline paper according to the present invention.

FIG. 2 illustrates an alkaline paper comprising a first paper layer 2 comprising alpha-cellulose, an alkaline buffer and an alkaline size, wherein the pH of said first paper layer is from 7.5 to 10.2, preferably, 8.5–10.2; a second paper layer 3 consisting of non-buffered, substantially pure, alpha-cellulose and an alkaline size; and intermediate said first and second paper layers, a layer 4 of water-impermeable plastic.

The layer 4 of water impermeable plastic acts as a barrier against liquid water, other liquids and acids, and against gases and other atmospheric impurities. Moreover, this layer separates the non-buffered layer 3 from the buffered layer 2 preventing migration of alkalinity into the non-buffered layer. The water-impermeable plastic layer is preferably a layer of polyester film. Suitable polyesters include Mylar D (Dupont) and Melanex type 516 or type 0 (ICI, Ltd.) which are biaxially drawn films of polyethyleneterephthalate. The buffered layer 2 contains an alkaline buffer, usually $CaCO_3$ or $MgHCO_3$ in an amount of at least 3% by weight, preferably 3 to 5%, to ward off the effects of atmospheric pollutants and acids or impurities which may migrate from adjacent materials. Thus, the alkaline paper prevents and/or inhibits the passage of outside impurities to the artifact and prevents the container composition from adversely affecting the artifact.

Figure 3:
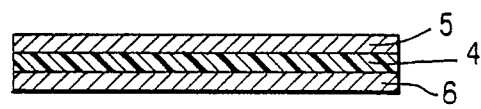
FIG. 3 is a sectional view of a three-layer boxboard according to the present invention.
Figure 5:
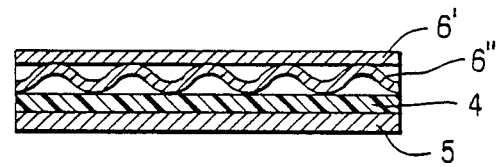
FIG. 5 is a sectional view of a three-layer boxboard according to the present invention wherein one layer is corrugated.

FIG. 3 illustrates a similar construction for a boxboard comprising a first layer of paperboard 5 consisting of non-buffered substantially pure alpha-cellulose and an alkaline size; a second layer of paperboard 6 comprising alpha-cellulose, an alkaline buffer and an alkaline size; and, intermediate said first and second layers, a layer of water-impermeable plastic 4. The first layer of paperboard meets all the requirements previously set forth for the substantially pure alpha-cellulose paper sheet. The water-impermeable plastic layer also corresponds to that previously described. The second layer of paperboard is produced from a fully bleached kraft pulp, free of lignin, groundwood, particles of metal, waxes and plasticizers. Preferably, this paperboard is hard sized to a Cobb size test of not more than 100 grams per square meter (TAPPI T-441 (05-69)). The surface of the board is smooth, free from knots, shives and abrasive particles. Preferably the paperboard has a pH of not less than 7.5, most preferably, not less than 8.5, nor more than 10.2. An alkaline size, as previously described, is used. The alkaline buffer, as previously described, is present in an amount of at least 3% by weight. Preferably, the paperboard has a maximum fiber loss of one-tenth of one percent after 100 cycles, according to TAPPI T-476 to assure that the box is made from a strong highly calendared boxboard and will withstand repeated handling over the years without fraying and deteriorating. According to TAPPI UM-518, the paperboard preferably shows a minimum smoothness of 195 Sheffield units following the test, assuring that the boxboard is strong and dense. The following preferred characteristics are set forth with respect to a paperboard sample having a thickness of 0.010 inch, since standard laboratory testing equipment cannot cope with thicker plies of paperboard due to its extreme strength. A 0.010 inch paperboard withstands a minimum of 1,000 double folds in the weakest direction of 1 kg. load, after conditioning according to TAPPI T-511. A 0.010" paperboard has a minimum tear resistance of 350 grams per sheet after conditioning according to TAPPI T-414 (Elmdorf). A 0.010" paperboard has at least 2,800 stiffness units in the machine direction and 1,400 stiffness units in the cross direction in accordance with TAPPI T-489. The outer surface of this paperboard is dyed with a light-fast and non-bleeding dye, preferably, as a dull non-reflecting surface, so as to retain a fresh clean appearance. When the paperboard is exposed for 30 hours in a standard fadeometer TAPPI UM-461, the difference in brightness measured on the exposed and unexposed portions of the sample is preferably less than 5 points, TAPPI T-452. The paperboard preferably has a bursting strength of at least 300 psi according to TAPPI T-807. The second layer of paperboard has been illustrated as a solid fiber paperboard. However, the second layer can also be formed as a corrugated paperboard (FIG. 5). In this configuration, layer 6 is replaced by a liner layer 6' and a corrugating medium layer 6" both layers comprising alpha-cellulose, an alkaline buffer and an alkaline size, as previously set forth.

Figure 4:
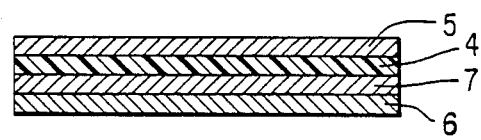
FIG. 4 is a sectional view of a four-layer boxboard according to the present invention.

FIG. 4 illustrates a further embodiment of the boxboard wherein, intermediate said layer 4 and said layer 6, a third layer 7 comprising alpha-cellulose, an alkaline buffer and an alkaline size is provided. This third layer 7 has a lower density than the second layer 6. Typically, the higher density layer will have a density of about 14 lbs. per point of thickness, while the lower density layer will have a density of about 11 lbs. per point of thickness. This third layer is typically 0.020" thick in boxboard having an overall thickness of 0.060" or more. The lower density allows the boxboard to more readily absorb and release moisture as the humidity in the storage environment changes, i.e. the lower density board is less subject to expansion and contraction with humidity change and is more flexible so as to prevent delamination. The lower density also allows clearly delineated uniform scoring lines to be scored on the boxboard for folding.

Figure 6:
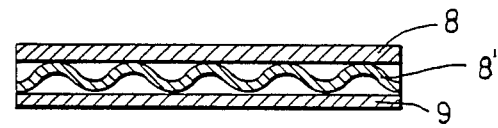
FIG. 6 is a sectional view of a single wall corrugated boxboard according to the present invention.
Figure 7:
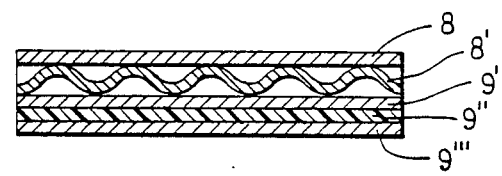
FIG. 7 is a sectional view of a single wall corrugated boxboard according to the present invention utilizing a three-layer liner layer.

As previously noted, it is also possible to prepare corrugated boxboards from the alpha-cellulose compositions of this invention. FIG. 6 illustrates a single wall corrugated boxboard comprising a first liner layer 8, a second liner layer 9, and, intermediate layers 8 and 9, a corrugating medium 8'. Layers 8 and 8' comprising alpha-cellulose, an alkaline buffer and an alkaline size, as previously described. Layer 9 comprising a layer consisting of non-buffered, substantially pure alpha-cellulose and an alkaline size. Alternatively, layer 9 can comprise three layers 9', 9" and 9'" (FIG. 7) wherein layer 9', adjacent the corrugating medium, comprises alpha-cellulose, an alkaline buffer and an alkaline size, layer 9", sandwiched between layers 9' and 9'", comprises a layer of water-impermeable plastic, and layer 9'" consists of non-buffered, substantially pure alpha-cellulose and an alkaline size.

Figure 8:
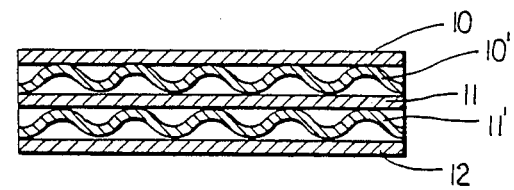
FIG. 8 is a sectional view of a double wall corrugated boxboard according to the present invention.
Figure 9:
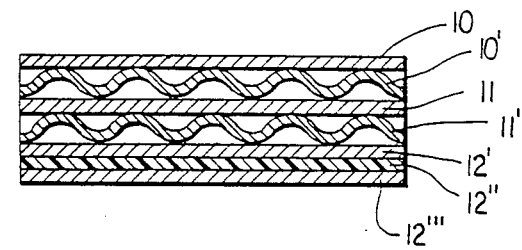
FIG. 9 is a sectional view of a double wall corrugated boxboard according to the present invention utilizing a three-layer liner layer.

FIG. 8 illustrates a double wall corrugated boxboard comprising first, second and third liner layers 10, 11 and 12, respectively; a first corrugating medium 10'; and a second corrugating medium 11'. Layers 10, 10', 11 and 11' comprise alpha-cellulose, an alkaline buffer and an alkaline size. Layer 12 comprising a layer consisting of non-buffered, substantially pure, alpha-cellulose and an alkaline size. Alternatively, layer 12 can comprise three layers 12', 12" and 12'" (FIG. 9) wherein layer 12' adjacent layer 11', comprises alpha-cellulose, an alkaline buffer and an alkaline size, layer 12", sandwiched between layers 12' and 12'", comprises a layer of water-impermeable plastic and layer 12'" consists of non-buffered, substantially pure alpha-cellulose and an alkaline size.

The container materials, as described above, can be made by conventional paper-making processes using conventional equipment. In particular, an alpha-cellulose pulp can be prepared from soft woods, hard woods, mixtures thereof and cotton. Preferably, the substantially pure alpha-cellulose is prepared from a soft wood pulp; while the alpha-cellulose for use in the production of buffered material is prepared from a mixture of soft wood and hard wood pulp. The pulp is conventionally produced by the kraft process, wherein a mixture of sodium sulfide and sodium hydroxide is contacted with the material to be pulped to remove sufficient lignin to permit fiber separation. The raw fibers so produced are fully bleached, i.e. the residual lignin, colored carbohydrate derivatives and traces of other coloring matter in unbleached pulps are removed or converted to colorless form by treatment of the pulp with oxidative or reductive chemicals. Generally, the pulp is bleached in stages using a combination of bleaching agents. Chlorination is typically the first stage in the sequence. Chlorolignins are formed intitally, but these are quickly converted to colored quinoid compounds which are soluble in the alkaline washing liquor applied to the pulp after chlorination. Next, the washed, chlorinated pulp is oxidized with an alkaline hypochlorite solution followed by a washing stage. Additional hypochlorite, chlorine dioxide, peracetic acid or sodium peroxide bleaching stages, each followed by alkaline and water washes may be used until the aforementioned degree of purity is achieved. Variations in the treatment are necessitated by variations in the pulp starting material. The pulp is then brought to a consistency of about 8% by weight pulp in water and subjected to defiberizing ("beating"), i.e., by mechanical treatment a partial breakdown of the fiber structure into fine fibrillae of varying dimensions is achieved. The so produced fibrillae and fibrillated fibers have an increased flexibility which increases the bonding of fibers in paper and increases the strength of paper products produced therefrom. If alkaline buffers such as $CaCO_3$ and $MgHCO_3$ or dyes are to be added, they are added during this defiberizing treatment. The slurry is then diluted to about 0.5% by weight fiber and about 99.5% by weight water. This diluted slurry is then used to make sheet material by running the slurry over a moving endless belt of wire (Fourdrinier machine) or by running the endless belt of wire through one or more fiber suspensions (cylinder machine). The wet sheet containing about 80% by weight water is then run through press rolls, where the water content is reduced to 60–70% by weight. The sheet then passes through heated drying rolls where the water content is reduced to 4–7% by weight. The dry sheet then passes through a size press where alkaline surface sizing is added. The sized sheet is then subjected to further drying followed by calendaring to impart the desired density and surface finish to the product.

The multi-layer materials of the invention can be formed by conventional means. In particular, corrugating medium can be adhesively bonded to adjacent liner layers using conventional starch adhesives. Likewise adjacent layers of solid fiber board or paper can be bonded to each other using a non-plasticized polyvinyl alcohol (PVA) adhesive, as well as to the water-impermeable plastic layer. Alternatively, a layer of polyethylene can be interposed between layers of board, paper, corrugating medium or plastic, and upon the application of heat and pressure, the various layers can be melt-bonded to one another. Additionally, where intermixing of components is not a problem, the cylinder machine can be utilized to build up a number of different layers by varying the fiber suspensions through which the endless belt runs.

The archival construction materials of the present invention can be formed into numerous types of containers utilizing conventional methods and machinery. The paper of the present invention can be utilized as separator sheets or envelopes for the storage of photographic artifacts. Likewise, the alkaline paper of the present invention can be utilized in the same manner while affording additional protection against the intrusion of contaminants in the environment. The boxboards can be fashioned into boxes, cartons or containers which afford the same protection. Moreover, by providing a lining of non-buffered, substantially pure alpha-cellulose to contact and/or face the contained artifact, no untoward degradation of the artifact will occur. By providing a water-impermeable plastic layer, the intrusion of environmental pollutants or other components in the container composition is prevented. Moreover, by including a buffering agent in the outer layer(s) atmospheric pollutants, acids and other potentially harmful substances are neutralized, thus, neutralizing any pollutants which might be capable of penetrating the container and/or be capable of penetrating the water-impermeable plastic layer.

What is claimed is:

1. A boxboard comprising: a first layer of paperboard consisting of non-buffered, substantially pure alpha-cellulose and an alkaline size; a second layer of a paperboard comprising alpha-cellulose, an alkaline buffer and an alkaline size; and, intermediate said first and second layers, a layer of water-impermeable plastic.

2. The boxboard as claimed in claim 1, wherein the pH of said second layer is not less than 7.5 nor more than 10.2.

3. The boxboard as claimed in claim 2, wherein said pH is not less than 8.5 nor more than 10.2.

4. The boxboard as claimed in claim 1, further comprising a third layer of paperboard, intermediate said layer of water-impermeable plastic and said second layer, comprising alpha-cellulose, an alkaline buffer and an alkaline size, said third layer having a lower density than said second layer.

5. The boxboard as claimed in claim 1, wherein said water-impermeable plastic layer is a layer of polyester film.

6. The boxboard as claimed in claim 1, wherein said second layer of paperboard is a corrugated paperboard.

7. A single wall corrugated boxboard comprising a first liner layer comprising alpha-cellulose, an alkaline buffer and an alkaline size; a second liner layer comprising a layer consisting of non-buffered, substantially pure alpha-cellulose and an alkaline size; and, intermediate said first and second liner layers, a corrugated medium comprising alpha-cellulose, an alkaline buffer, and an alkaline size.

8. The single wall corrugated boxboard as claimed in claim 11, wherein said second liner layer comprises: (a) a layer comprising alpha-cellulose, an alkaline buffer and an alkaline size, adjacent to said corrugated medium; (b) a layer consisting of non-buffered, substantially pure alpha-cellulose and an alkaline size; and, intermediate said layers (a) and (b), a layer of water-impermeable plastic.

9. The single wall corrugated boxboard as claimed in claim 8, wherein said water-impermeable plastic layer is a layer of polyester film.

10. A double wall corrugated boxboard comprising: first, second and third liner layers; a first corrugated medium, intermediate said first and second liner layers; and a second corrugated medium, intermediate said second and third liner layers; wherein said first and second liner layers and said first and second corrugated media comprise alpha-cellulose, an alkaline buffer and an alkaline size; and said third liner layer comprises a layer consisting of non-buffered, substantially pure, alpha-cellulose and an alkaline size.

11. The double wall corrugated boxboard as claimed in claim 10, wherein said third liner layer comprises (a) a layer comprising alpha-cellulose, an alkaline buffer and an alkaline size, adjacent to said second corrugated medium; (b) a layer consisting of non-buffered, substantially pure alpha-cellulose and an alkaline size; and, intermediate said layers (a) and (b), a layer of water-impermeable plastic.

12. The double wall corrugted boxboard as claimed in claim 10, wherein said water-impermeable plastic layer is a layer of polyester film.

13. An alkaline paper comprising a first paper layer comprising substantially pure alpha-cellulose, an alkaline buffer and an alkaline size, wherein the pH of said first paper layer is from 7.5 to 10.2; a second paper layer consisting of non-buffered, substantially pure, alpha-cellulose and an alkaline size; and, intermediate said first and second paper layers, a layer of water impermeable plastic.

14. The alkaline paper as claimed in claim 13, wherein said layer of water-impermeable plastic is a layer of polyester film.

15. The alkaline paper as claimed in claim 13, wherein said pH is from 8.5 to 10.2.

* * * * *